June 17, 1930.   F. D. FIELDER   1,764,294
HIGH VOLTAGE VOLTMETER
Filed June 13, 1929

INVENTOR
Frederick D. Fielder.
BY
ATTORNEY

Patented June 17, 1930

1,764,294

UNITED STATES PATENT OFFICE

FREDERICK D. FIELDER, OF WILKINSBURG, PENNSYLVANIA, ASSIGNOR TO WESTING-HOUSE ELECTRIC & MANUFACTURING COMPANY, A CORPORATION OF PENNSYLVANIA

HIGH-VOLTAGE VOLTMETER

Application filed June 13, 1929. Serial No. 370,514.

My invention relates to high-voltage voltmeters and more particularly to voltmeters of the kind described in United States Patent No. 1,702,421, dated February 19, 1929, granted to Harold B. Smith.

The voltmeter disclosed in the above-mentioned patent comprises a high-voltage repulsion-type voltmeter consisting, essentially, of two elements, one fixed and one movable, so shaped and arranged that no corona is present within the high-voltage working range of the instrument. The principle of operation of that voltmeter is that the fixed and the movable elements are charged with like electrostatic charges, and, therefore, repel each other an amount proportional to the magnitude of the voltage to be measured, which is indicated by a mirror mounted on the movable element to coact with a scale and a telescope disposed nearby.

My invention has for an object to provide means for improving the construction of the meter described in the patent mentioned above.

Another object of my invention is to provide means for measuring high voltages by a novel instrument having a high degree of flexibility in operation and construction.

I have discovered that one moving element without an associated fixed element produces a highly satisfactory deflection. In addition, my single-element meter has the advantages, over meters of the prior art, of a more simple construction, a saving in material, and greater flexibility as regards operation and construction.

My invention may be more readily understood if the accompanying drawings are consulted in connection with the following description.

The meter consists of a single movable element 1 mounted within a hollow high-voltage terminal 2 in such manner that the rounded end of the element projects through the terminal wall. Corona effects, resulting from sharp points or angles on the element 1, are thereby eliminated.

Figure 1:
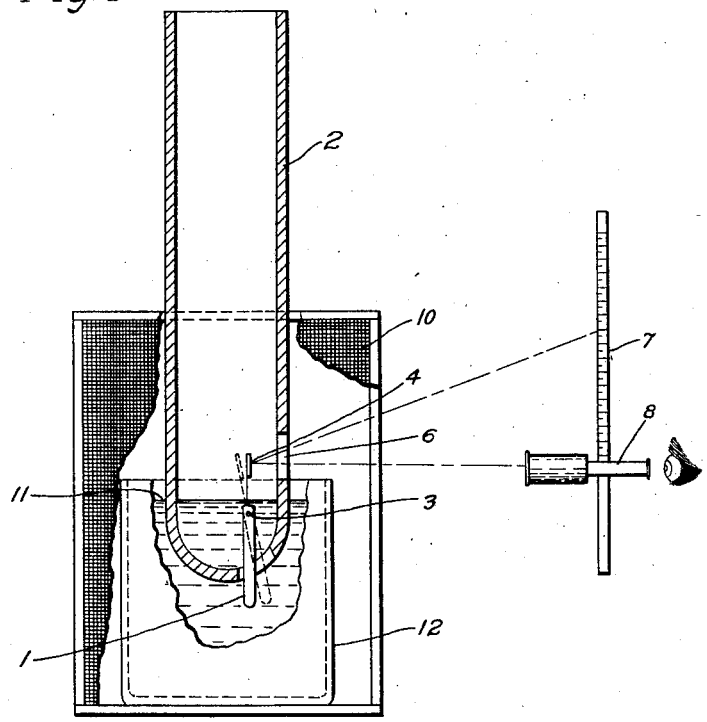
Fig. 1 is a view, in side elevation—parts being broken away for clearness—of a high voltage voltmeter constructed in accordance with my invention.
Figure 2:
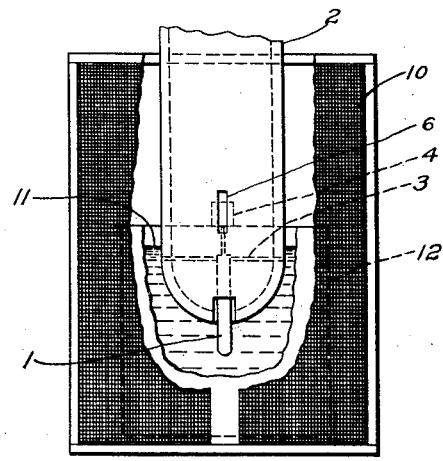
Fig. 2 is a view, in front elevation, of the device shown in Fig. 1.

The element 1 is mounted on a horizontal shaft 3 that is journalled in the opposite sides of the wall of the terminal 2. A mirror 4 is mounted on the element 1 for movement therewith. An opening 6 is provided in the side wall of the terminal 2 so that the relative angular deflection of the mirror 4 may be observed by means of a scale 7 and a telescope 8 by an observer, as indicated in Fig. 1.

The lower end of the terminal 2 is surrounded by an electrically grounded screen 10 which serves to eliminate the harmful effect of extraneous fields. The movable element is submerged in a body of oil 11 to properly damp the movement thereof. The oil 11 is contained in a receptacle 12 resting in the bottom of the screen 10.

The operation of my device is as follows. When a high voltage is applied to the terminal 2, electrostatic lines of force radiate normal to the surface thereof, and the element 1 tends to assume a position to cut the least number of lines of force, or, in other words, in line with the direction of the field influencing it, thus producing a deflection proportional to the magnitude of the voltage applied to the terminal 2. It is to be understood, of course, that the element 1 is normally biased to the position shown by the force of gravity.

The distance of the element 1 from the central axis and its physical characteristics affect the calibration of the device. The maximum voltage to be measured by the meter depends upon the size of the movable element, because the radius of curvature of the end thereof must be greater than that representing the corona limit for a given voltage. Since the movable element is submerged in oil, having a high specific inductive capacity, flashover from the movable element to the grounded cage cannot take place. The limiting voltage, therefore, is that voltage which will cause flashover between the upper part of the grounded screen and the terminal 2.

The use of a single movable element, as described above, results in a meter of more simple construction, less material, and greater flexibility than has heretofore been available for high-voltage service.

It will be apparent to those skilled in the art that the terminal 2 may be more easily manufactured to prevent the formation of corona by making the outer surface of the lower end thereof smooth, as I have provided, than in the case where the outer surface is provided with a fixed projection, or teat, for coaction with the movable element, as in the prior art represented by the voltmeter of the patent referred to above. A terminal having a smooth surface is more easily manufactured and, in operation, it eliminates an undesirable variable caused by the presence of the projecting element on the surface of the terminal. These favorable factors greatly simplify the voltmeter structure both in operation and construction.

While I have shown and described a particular form of my invention, changes may be made therein without departing from the spirit and scope thereof, as set forth in the appended claims.

I claim as my invention:

1. In combination, a hollow terminal having a smooth-surface semi-spherical end, an elongated member pivotally hung within said end, said terminal having an opening therein for the passage of said member, the electrostatic field of said terminal exclusively tending to move said member against the influence of gravity in accordance with the voltage producing it, and means for indicating the relative movement of said member.

2. A high-voltage instrument comprising a conducting-surface element having an apertured hollow portion and constructed to prevent the formation of corona thereon, and a similarly-constructed relatively movable conducting-surface element mounted inside said hollow portion and projecting through said aperture, said projecting element being actuated by the electrostatic field adjacent to said first element and the first element being free of any other projecting element adjacent to said movable projecting element.

In testimony whereof, I have hereunto subscribed my name this first day of June, 1929.

FREDERICK D. FIELDER.